US012650988B2

(12) United States Patent　(10) Patent No.:　US 12,650,988 B2

Marks-Bluth et al.　(45) Date of Patent:　Jun. 9, 2026

(54) FAST QUERY EXECUTION FOR LARGE DATASETS

(71) Applicant: Akamai Technologies, Inc., Cambridge, MA (US)

(72) Inventors: Alex Marks-Bluth, Rehovot (IL); Dan Ariel Elbert, Jerusalem (IL)

(73) Assignee: Akamai Technologies, Inc., Cambridge, MA (US)

( * ) Notice: Subject to any disclaimer, the term of this patent is extended or adjusted under 35 U.S.C. 154(b) by 22 days.

(21) Appl. No.: 18/321,822

(22) Filed: May 23, 2023

(65) Prior Publication Data

US 2024/0394257 A1　Nov. 28, 2024

(51) Int. Cl.
　*G06F 16/2455*　(2019.01)
　*G06F 16/2453*　(2019.01)
　*G06F 16/248*　(2019.01)

(52) U.S. Cl.
　CPC .... *G06F 16/2455* (2019.01); *G06F 16/24542* (2019.01); *G06F 16/248* (2019.01)

(58) Field of Classification Search
　None
　See application file for complete search history.

(56) References Cited

U.S. PATENT DOCUMENTS

| | | | | |
|---|---|---|---|---|
| 11,256,707 | B1 * | 2/2022 | Xiong | G06N 3/045 |
| 11,501,202 | B1 * | 11/2022 | Stefani | G06F 16/9038 |
| 12,101,336 | B2 * | 9/2024 | Nair | G06F 21/53 |
| 2009/0193014 | A1 | 7/2009 | Menezes et al. | |
| 2009/0265328 | A1 * | 10/2009 | Parekh | G06F 16/334 |
| | | | | 707/999.005 |
| 2015/0032678 | A1 | 1/2015 | Nagpal et al. | |
| 2021/0117868 | A1 * | 4/2021 | Sriharsha | G06F 16/24568 |
| 2023/0409577 | A1 * | 12/2023 | Andre | G06F 40/40 |
| 2024/0311693 | A1 * | 9/2024 | Smith | G06N 20/00 |

OTHER PUBLICATIONS

DataSketches, Sketch Elements, 3 pages, web page available at https://datasketches.apache.org/docs/Background/SketchElements.html, accessed Feb. 13, 2023.
DataSketches, The Challenge: Fast, Approximate Analysis of Big Data 1, accessed Feb. 13, 2023, 7 pages, web page at https://datasketches.apache.org/docs/Background/TheChallenge.html.
Cormode, G. et al., "Synopses for Massive Data: Samples, Histograms, Wavelets, Sketches", Foundations and Trends in Databases, vol. 4, Nos. 1-3 (2011) 1-294, Copyright 2012, 296 pages.

* cited by examiner

*Primary Examiner* — Dawaune A Conyers

(57)　ABSTRACT

Systems and methods for querying large amounts of data are disclosed. Several different versions of a data feed are provided, ranging from a full set of data to various other versions that are smaller or faster to query (e.g., sampled versions, aggregations, sketches). A machine learning model is trained on features of input queries run against the various versions of the data feed and the corresponding results. The trained model is then applied to a new query to choose, automatically, which version of the data feed to apply the query against. That is, the system can select which version of the data feed to use when executing the given query, optimizing speed and/or compute costs while providing an appropriate level of accuracy for the given query.

18 Claims, 5 Drawing Sheets

FAST QUERY EXECUTION FOR LARGE DATASETS

BACKGROUND

Technical Field

This application generally relates to data storage, query execution on stored data, and to machine learning.

Brief Description of the Related Art

Large datasets are too large to fit into conventional indexed databases and so they are typically stored as data files in a system like Apache Hadoop, or blob storage. Ad-hoc queries on data can be hard to optimize, because the user's desired level of accuracy of results can vary, and also the computational cost of the query can vary dramatically.

For example, a security researcher analyzing network traffic may want to execute so-called 'exploratory' queries, to confirm a hypothesis or to get a general sense of the characteristics or trends exhibited by the traffic. In this exploratory phase, a high level of accuracy may not be important for the researcher, but long execution times are obstacles as well as costly. In contrast, once a particular attack or attack vector is identified, increasingly accurate results may be necessary to create access control lists, reputation scores, filters, or to implement other counter-measures.

The foregoing is merely one example, but how to trade accuracy for speed and cost in query execution is a general problem that arises in many contexts. The teachings of this document present systems and methods for improving the execution of queries against large sets of data, such as by reducing execution time and computing costs associated therewith.

The teachings presented herein improve the functioning of a computer system itself. Those skilled in the art will understand these and other improvements from the teachings hereof.

BRIEF SUMMARY

This section describes some pertinent aspects of this invention. Such aspects are illustrative, not exhaustive, and they are not a definition of the invention. The claims of the issued patent define the scope of protection.

Improved systems and methods for querying large sets of data are disclosed. Several different versions of a data feed are provided, ranging from a full set of data to various other versions that are smaller in size (e.g., sampled versions, aggregations, sketches) . . . . The full version may contain a complete set of records (for example, all records for a given time period, with all key fields populated). A sampled version can be created with less detail, e.g., a subset of records from the time period; or, certain keys or fields may be truncated or dropped from the records. Also, a less detailed data sketch of the feed can be created using known stochastic streaming algorithms applied to the feed. A machine learning model is trained on features of queries run against the various versions of the data feed and corresponding results. The trained model is then applied to a new query to choose, automatically, a version of the data feed to use. That is, the system can select which version of the data feed to use when executing the given query, increasing speed and reducing cost while providing an appropriate level of accuracy for the given query. In some implementations, a supplemental model (referred to as a checking model) is applied to determine whether the results returned by the query selected by the initial model are acceptable (e.g., whether a minimum number of results are returned), or whether the query should be re-run on another version of the data feed.

The claims are incorporated by reference into this section, in their entirety.

BRIEF DESCRIPTION OF THE DRAWINGS

The invention will be more fully understood from the following detailed description taken in conjunction with the accompanying drawings, in which.

Figure 1:
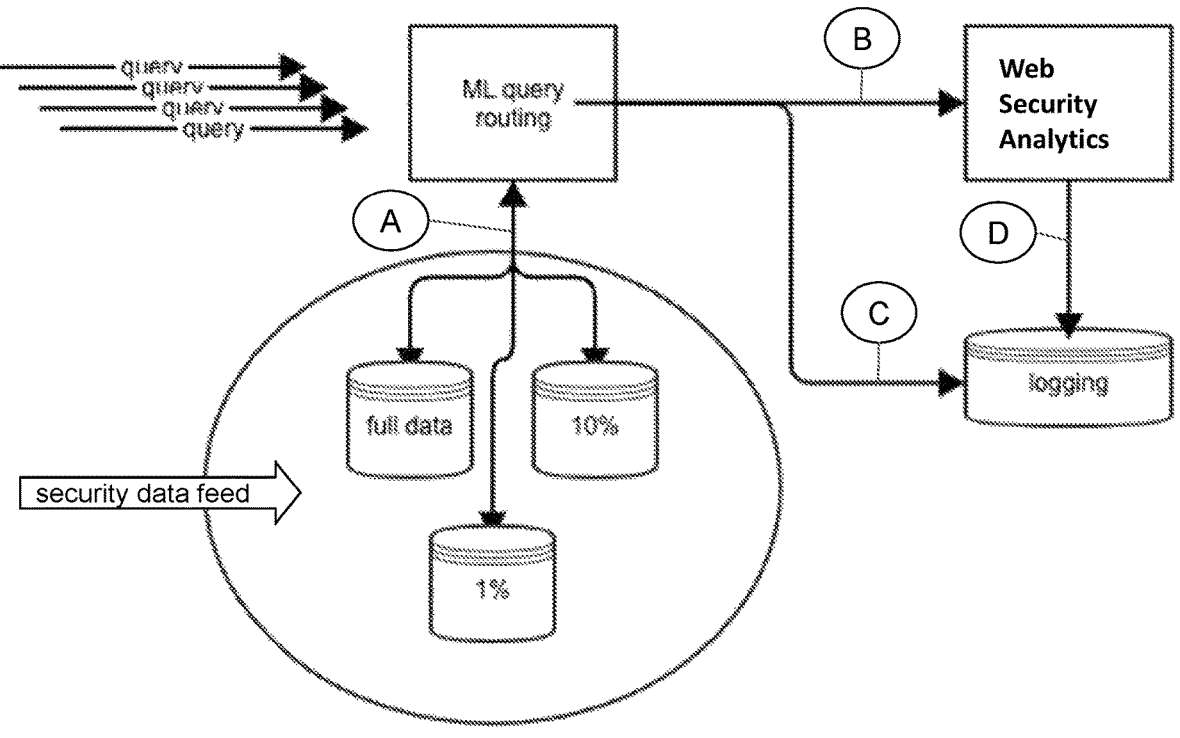
FIG. 1 is a diagram illustrating a system for the automated routing of queries to version of a data feed, as selected by a machine learning component, all in accord with one embodiment of the invention.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the systems and methods disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web, streaming, and networking technologies and terms, such as HTML, URL, XML, AJAX, CSS, GraphQL, all HTTP versions, MQTT, TCP/IP, and UDP, is assumed. Likewise, basic familiarity with well-known database technologies and terms, such as relational databases (RDBMS), SQL databases and queries, NoSQL databases and/or key-value approaches, as well as large data querying techniques, e.g. using such tools as Hadoop and Spark, is assumed.

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

INTRODUCTION

A system is provided to reduce cost and optimize speed for queries on large data sets. The system leverages machine learning (ML) techniques. The design presented herein provides a way to generate and run a model (or series of models), incorporating a continuous learning model.

The following examples use web security analytics (WSA) as the context for the data being analyzed. However, the teachings of this document are agnostic to the nature of the data or the research/analysis being conducted.

FIG. 1 illustrates a system operating in accordance with an embodiment of the invention. In this high level example, queries are being applied and the results sent to a WSA component. The WSA component is a conventional component that acts as a client to the query routing system. The WSA can include a user interface (security dashboard) for entering and viewing the results of queries, and also can include controls for actuating security countermeasures such as firewalls, filters, and the like. Input queries enter at the left of the diagram; they may be user queries or queries generated by APIs (application programming interface) or automated processes.

Based on a trained model, the ML query routing component examines the features of the query and routes it to one or more versions of a data feed, which are shown in the circle below the ML query routing component. Arrow A shows queries being routed to, and results returned from, a few different curated versions of a data feed, which in this example relate to network security data. One version is a full (original) version of the data feed. The other feeds are lesser fidelity versions in some respect(s). For example, a second version can be a sampled data feed (10% of records), and a third version can be a 1% sampled data feed. Of course, these are merely examples. Any percentage of sampled data could be used, as could a version of the data feed with thinned records (e.g., records with some key-value pairs removed, or with values rounded, bucketized, or truncated), aggregated records, and a data sketch generated version. Generalizing, there are multiple data sets to run a query against, typically an original and one or more lesser fidelity versions. The teachings hereof are agnostic to the content and the nature of the differences between the various versions.

Arrow B indicates that the ML query routing component sends a copy of the results to the WSA component, where it can be used for, e.g., research and analysis, visualization, and/or other purposes.

Arrow C indicates that the ML query routing component also sends a copy of the results to a logging component, where it will be used for training and maintenance (updating) of the ML model.

Arrow D indicates that the WSA component sends information (feedback) to the logging system. Such information typically reflects whether the user found the query results useful (as indicated, e.g., by explicit feedback, the time spent using the results, or monitored events such as the user re-running the query on a different version of the data feed.). The logging component may also be informed about the cost (e.g., the time and/or processing cycles, memory) of executing the query on the selected version of the data feed. The cost can be captured when the query is executed (that is, on that machine executing it); the captured cost can be sent directly by the machine executing the query to the logging component, or via the ML query routing component to the logging component, or via the WSA component, or via another channel. For purposes of the following discussion, it will be assumed that the cost information is transferred via the channel indicated by arrow C.

Figure 2:
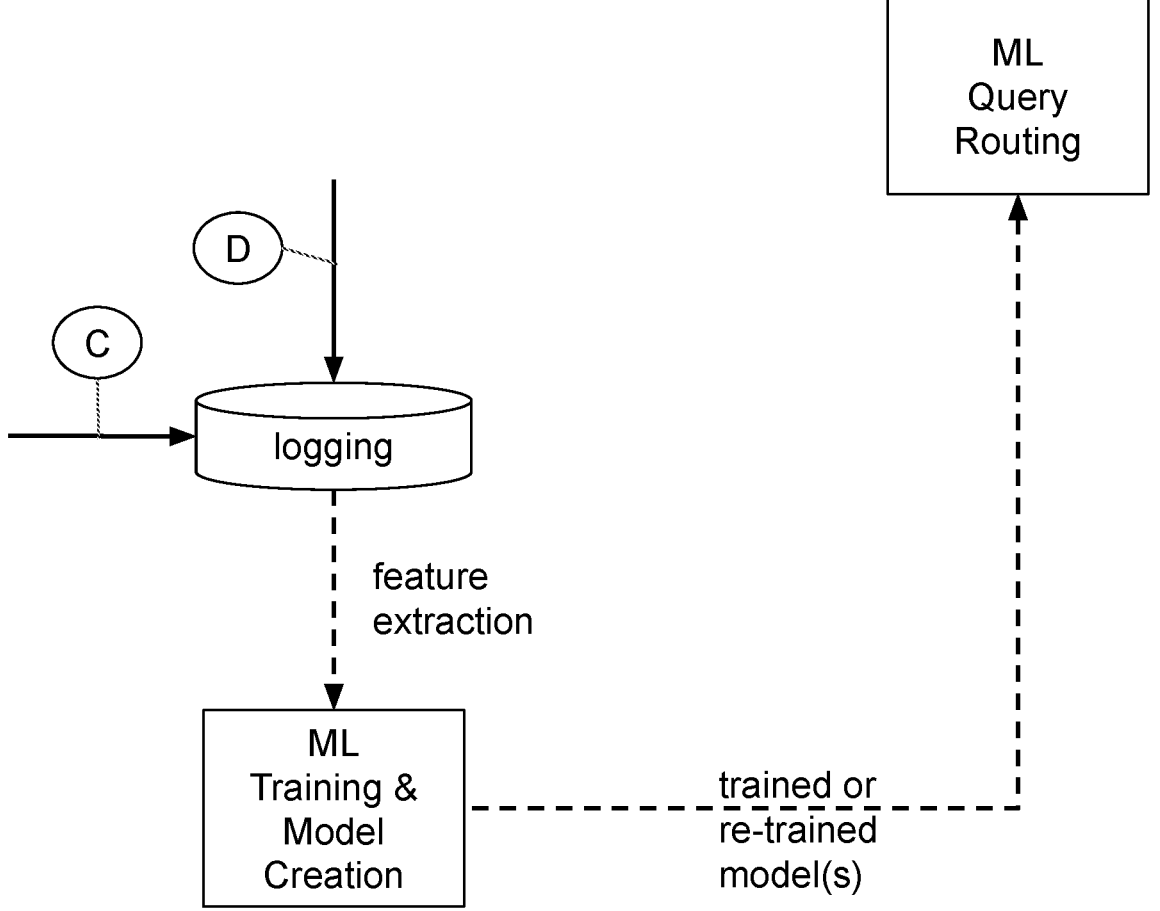
FIG. 2 is a diagram illustrating additional detail of the system shown in FIG. 1.

FIG. 2. is a diagram that supplements FIG. 1. FIG. 2 shows how the information captured in the logging component is used within ML training & model development to create and/or update a model that is installed into the ML query routing component.

With the preceding by way of introduction and context, exemplary details of model training and creation will now be described.

Routing Model Design

The creation and tuning of the routing model takes place in several phases. The first phase is a 'model bootstrap' phase, in which an initial ML model(s) is trained.

Second, after training, there is a continuous learning phase. The continuous learning phase can be thought of as the normal running mode of the system, with continual improvement and update of the model(s) (that is, a feedback mechanism). Preferably there are two models running in series during the continuous learning phase, a 'routing model' and a 'checking model'. In operation, the routing model determines which version of the data stream that a given query should execute against (that is, which set of data to route the live query towards); it is part of the ML query routing component in FIG. 1. The checking model determines whether the result of that choice is sufficient (based on certain criteria), or whether it needs to be run against another version of the data stream, e.g., with less sampling or of higher fidelity.

Third, there is an 'experimental' phase. This phase is designed to run when new versions of the data stream are introduced, a new data source is introduced, or a new type or class of model is being developed.

Preferably, the model is supervised. A suitable model is selected based on the characteristics of the query system to which the model is being applied, taking into account conventional considerations such as available query parameters, cardinality, tokenization capabilities or constraints, and the like.

Bootstrap Phase for Routing Model

In this phase, each incoming query is run against the full version of the data feed and several other feeds, with the results being logged by the logging component (FIG. 1). Only the results from the full data query are presented to the WSA component (arrow B in FIG. 1). Essentially the other queries are run in the background, that is, in a shadow mode.

A cost function is defined to quantify the difference between the results of running a given query across the various versions of the data stream. The goal is to assess the cost of running the query against each version of the data feed, relative to a reference version, which is usually the full version, while also taking into account accuracy Parameters include:

time to run query

% accuracy compared to full data feed computing resources needed to run the query (for example, expressed in units of compute such as Databricks units, or total virtual machines cost, etc.)

The cost function can be used to calculate (and optimize) the level of accuracy of the query results and the time and/or compute resources saved. One approach would be to configure a level of acceptable accuracy degradation, for example: "90% of the queries are 99% accurate compared to full queries" and then the cost function can be applied to search for the data stream version to use that provides the least time and compute resource consumption (with some relative weighting, or perhaps maximum thresholds).

Hence, assuming different versions of a data stream $\{S\_1, S\_S, S\_3 \ldots S\_n\}$, then for a given query Q, there are a set of results generated $\{R\_1, R\_2, R\_3 \ldots R\_n\}$ and each of those results is associated with a respective cost calculated in accord with the cost function $\{C\_1, C\_2, C\_3 \ldots C\_n\}$. The query and the costs are captured and used to train a predictive model. The captured data can be expressed as $\{Q; R\_1 \ldots R\_n; C\_1 \ldots C\_n\}$.

Features are extracted from the query that is received. To do this, the query is tokenized and features are extracted for training the model. Here is a pseudo-example:

a. customer account b. keys in the query, with keys categorized into features such as "high cardinality key" (e.g. IP address) and "low cardinality key" (e.g. country), which are separate features c. number of values inputted in each key, in each high/low cardinality key d. date range Here is an example of a query and extracted features:
Query=Country=UK AND TLS in ('foo', 'bar') AND date in (yesterday to today)

| feature | value |
| --- | --- |
| key_used_country | true |
| key_used_tls | true |
| key_used_country_values | 1 |
| key_used_country_tls | 2 |
| date range in seconds | 60*60*24 |
| has_high cardinality key | true |
| has low cardinality key | true |
| has IP filter | false |

Continuous Learning Phase

The model that was generated in the above 'bootstrap' phase is called the routing model, and it is executed in the ML query routing component to route input queries, as described in connection with FIG. 1. In addition, more training data can be created, and then based on this additional training data, the routing model can be periodically re-trained.

One way to generate more training data is to inject a sample of 'continuous learning' queries in the background to generate more training data, similar to the bootstrap phase. In other words, the system generates such queries and sends them to the ML query routing component for training; they are not user queries sent through the user interface or via API. The continuous learning queries might be synthetic or previously received input queries which are now being re-run on data feeds at a later point in time. The continuous learning queries can be run on various feeds, can be random or predetermined based on some logic (e.g., a sampling of prior queries run periodically). Preferably, the continuous learning queries are a relatively small percentage of the total queries, such that they don't significantly impact the savings being achieved. In an alternative embodiment, training data can be generated by randomly selecting some proportion of actual user queries that were received, and injecting these back against all versions of the data stream. The actual use queries can include those that were previously selected by the ML routing component to execute against the low-fidelity version of the data stream. These queries can be run in "shadow mode" against all versions of the data stream.

A second way to generate more training data, not mutually exclusive with the first, is to add a human feedback loop. This approach involves adding an option to the user interface (of the WSA in FIG. 1) for the user to request that the system "show me the full results", and to record for which queries the user presses it. The concept is that if a user activates this option, the user needs more detailed/accurate results than provided by the version of the data feed that was initially selected by the ML query routing component. Note that this information can be filtered for account/user, to look for relevant patterns. The goal is determine which queries originally selected for and executed against the in the low-fidelity version have a large probability of needing to be re-run and therefore the model should tend to not select them to run in the lower-fidelity.

Checking Model

Figure 3:
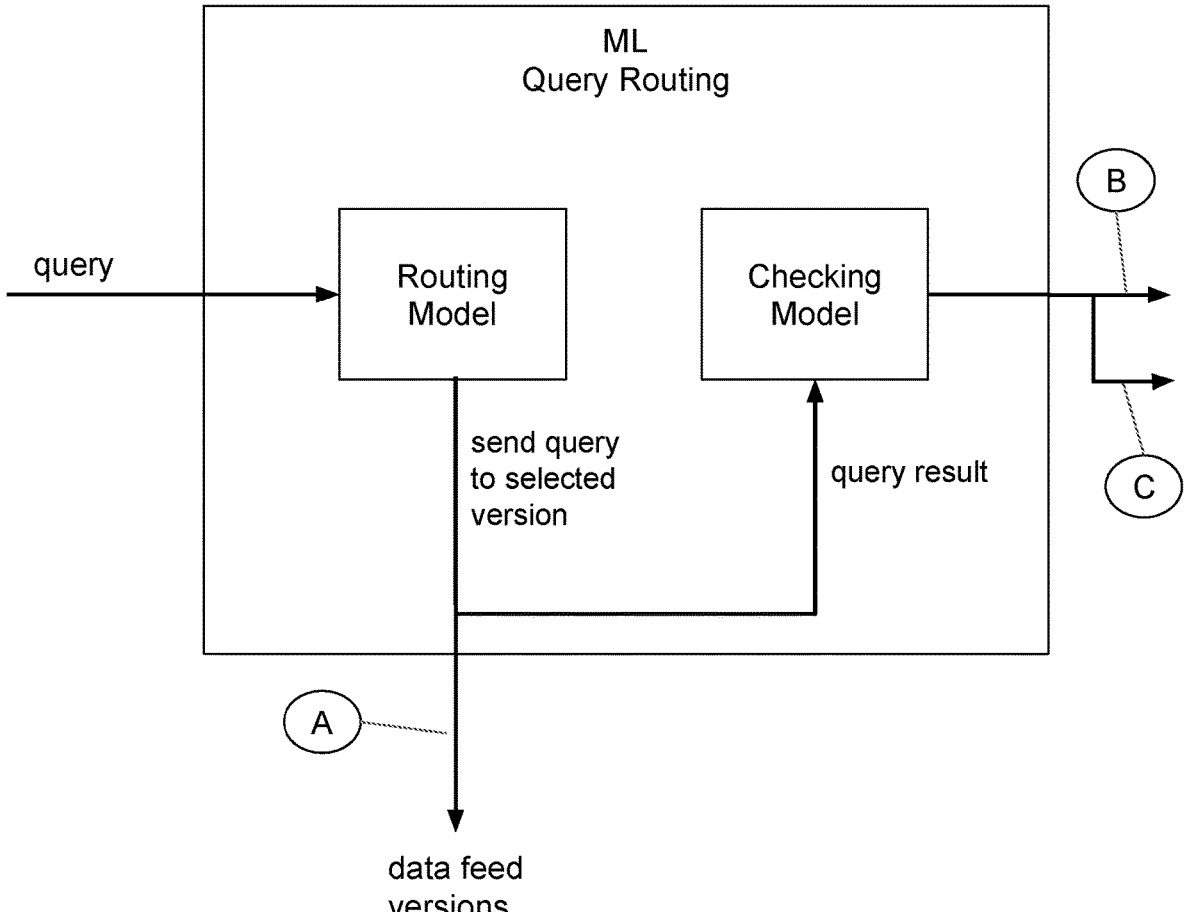
FIG. 3 is a diagram illustrating additional detail of the ML Query Routing component shown in FIG. 1.

The foregoing description has focused on the routing model, but FIG. 3 illustrates how the ML Query Routing component can leverage two independent models. The routing model receives input queries and selects a version of the data feed against which the query should be executed, as already described. The checking model examines the results of the query against the selected version, and determines whether to rerun the query on another version of the data feed (e.g., typically the full data feed, or at least some version other than what was initially selected).

The checking model is an optional component; in some embodiments, the query results could be sent directly out as shown by arrows B and C. However, the checking model provides a measure of safety. If the query results returned initially are too small (too few records returned based on the features of the initial query or past user behavior in the WSA given such results), then the checking model can rerun the query so that the user does not have to. Other criteria which the checking model can incorporate include the distribution or results, or other relevant statistics. For example, the checking model can take as input the query parameters, number of results or distribution when the query is run in the low-fidelity version of the data stream, and learn to predict the query results in the high-fidelity or the expected accuracy. So by feeding the query parameters and low-fidelity results into the model, the system can predict if the accuracy compared to high-fidelity was good enough. Note that query results were not available to the routing model so it could not make this correction.

In addition, the checking model can take into account historical results. If the execution of a given query on a given version produces significantly different results as compared to prior time periods, then it may be desirable to re-run the query on a larger version of the data feed.

Note that, in less complex designs, the checking model can be implemented as a piece of logic that applies basic configured thresholds (e.g., result must have at least N records) to determine whether to rerun the query. The resultant action can be logically defined as well, e.g., if triggered, apply the query to the next larger version of the data feed, or apply the query to the full data version right away, and so on.

Experimental/New Feed Phase

Figure 4:
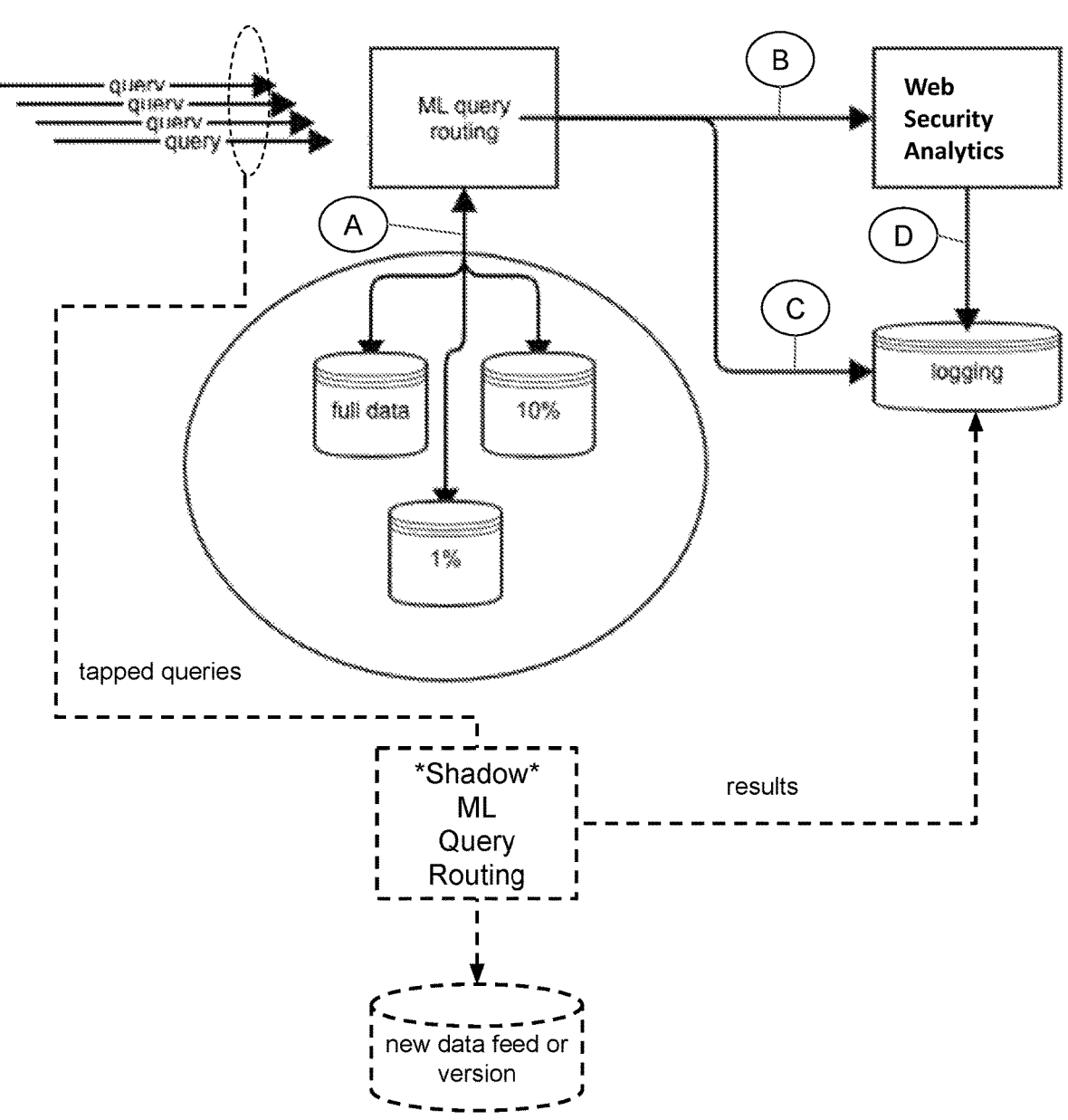
FIG. 4 is a diagram illustrating the use of a query tap and shadow execution in the experimental/new feed phase of operation of the system, in accord with one embodiment of the invention; and, FIG. 5 is a block diagram illustrating hardware in a computer system that may be used to implement the teachings hereof.

If it is desired to test the benefits of a new data feed, a new version of an existing data feed, or a new model, the system can be operated in a separate experimental phase. In this phase, the stream of input queries is tapped and replicated. The tapped queries are sent to be executed in shadow mode against the new data feed, new version, and/or using the new data model. The results are logged. A new model is thus trained (similar to as described above), and the model or the result of its execution are compared to the active system. FIG. 4 illustrates the concept at a high level, with the tap shown in dashed lines.

Other Embodiments

The foregoing embodiments are merely examples. A wide variety of alternative embodiments are possible.

For example, the system can further include smart caching of results based on a popular query. If a user always works on a set of data with a specific timeframe and query and just changes the groupBy, the underlying data could be cached. If the user always runs the same query but increments the time period (e.g., always "last week") then the system can cache the selection (of data) in the time period.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
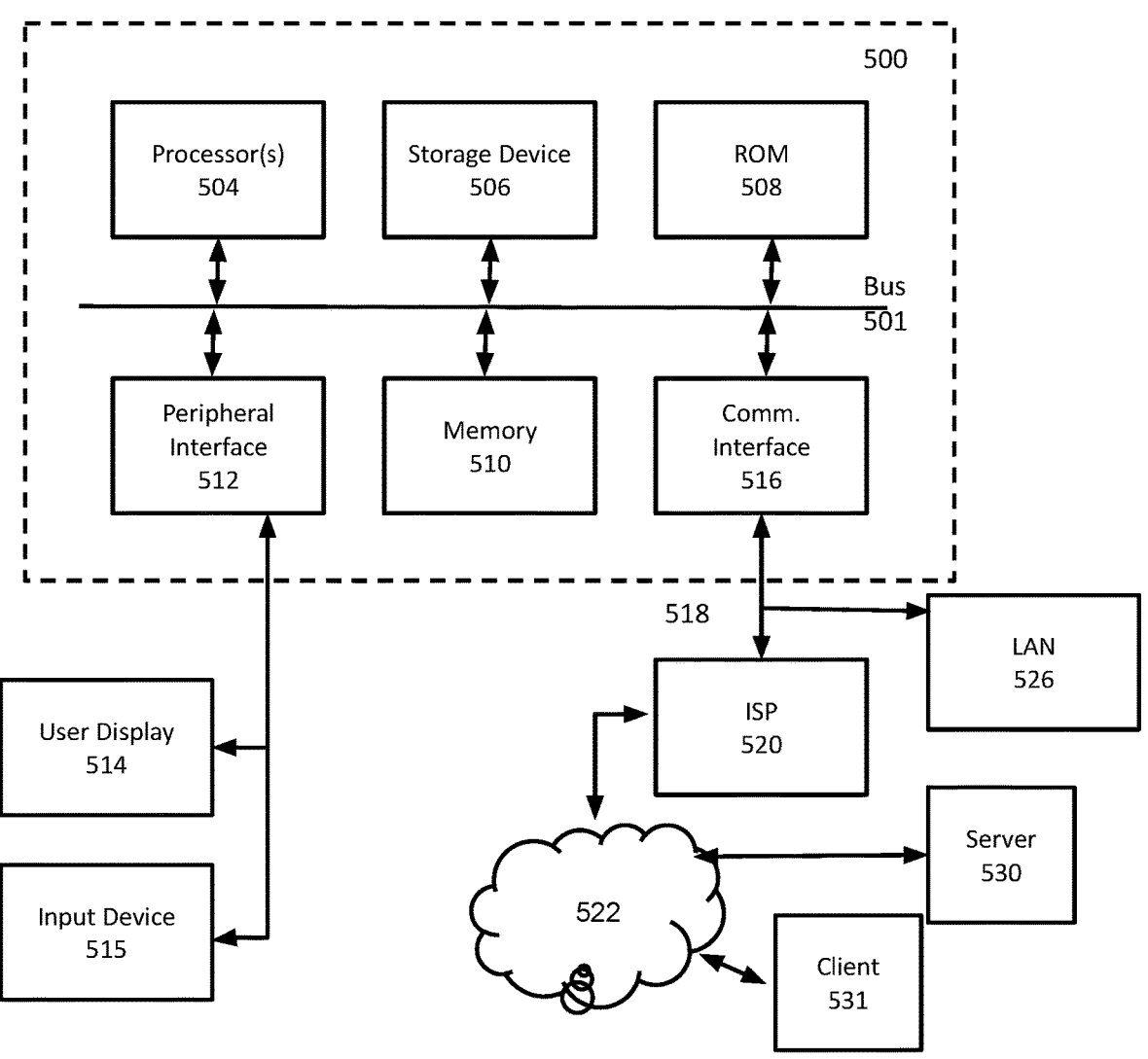

FIG. 5 is a block diagram that illustrates hardware in a computer system 500 upon which such software may run in order to implement embodiments of the invention. The computer system 500 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 500 includes a microprocessor 504 coupled to bus 501. In some systems, multiple processor and/or processor cores may be employed. Computer system 500 further includes a main memory 510, such as a random access memory (RAM) or other storage device, coupled to the bus 501 for storing information and instructions to be executed by processor 504. A read only memory (ROM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 may be provided to communicatively couple computer system 500 to a user display 514 that displays the output of software executing on the computer system, and an input device 515 (e.g., a keyboard, mouse, trackpad, touchscreen) that communicates user input and instructions to the computer system 500. However, in many embodiments, a computer system 500 may not have a user interface beyond a network port, e.g., in the case of a server in a rack. The peripheral interface 512 may include interface circuitry, control and/or level-shifting logic for local buses such as RS-485, Universal Serial Bus (USB), IEEE 1394, or other communication links.

Computer system 500 is coupled to a communication interface 516 that provides a link (e.g., at a physical layer, data link layer,) between the system bus 501 and an external communication link. The communication interface 516 provides a network link 518. The communication interface 516 may represent an Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 518 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method, comprising:

providing a first version and a second version of a data feed, the second version representing a reduced-size version of the first version;

training a machine learning model on a first set of queries, the training configuring the machine learning model to select between querying against (i) the first version of the data feed or (ii) the second version of the data feed;

where the training is performed using training data including:

one or more features of the first set of queries;

output of a cost function that calculates costs for executing one or more queries in the first set of queries on the first version of the data feed and execution thereof on the second version of the data feed;

after the training:

deploying the trained machine learning model for execution against a second set of queries;

receiving a given query in the second set of queries from a client;

providing one or more features for the given query in the second set of queries to the trained machine learning model;

executing the trained machine learning model against the provided one or more features to produce a selection between the first and second versions of the data feed;

executing the given query in the second set of queries against either the first or second versions of the data feed, as determined by the selection, to obtain a result; and, providing the result to the client, in response to the given query in the second set of queries.

2. The method of claim 1, wherein the second version of the data feed comprises any of: a sampling of the data feed and a data sketch of the data feed.

3. The method of claim 1, wherein the cost function is dependent upon one or more of: query execution time, result accuracy relative to a reference version of the data feed, compute cost for query execution, resource consumption for query execution.

4. The method of claim 1, wherein the data feed comprises data related to network security events.

5. The method of claim 1, wherein the training data further comprise any of:

a query key;

a cardinality measure of a query key;

a number of values associated with a query key; and, a date range.

6. The method of claim 1, wherein the training data further comprise any of:

a record of user action taken after receiving results of one or more of the queries in the first set of queries.

7. The method of claim 1, further comprising:

applying the result to a second trained machine learning model to determine whether to rerun the given query in the second set of queries against another version of the data feed other than the selected version;

where the determination is based on a statistic of the result.

8. The method of claim 7, wherein the statistic comprises any of:

a number of records in the result, and, a distribution of the result, and a comparison of the result to past results for similar or identical queries.

9. The method of claim 1, wherein the second version of the data feed is a smaller size version of the first version of the data feed.

10. A system, comprising:

one or more computers collectively having circuitry forming one or more processors and memory holding computer program instructions for execution on the one or more processors to cause the one or more computers to:

provide a first version and a second version of a data feed, the second version representing a reduced-size version of the first version;

train a machine learning model on a first set of queries, the training configuring the machine learning model to select between querying against (i) the first version of the data feed or (ii) the second version of the data feed;

where the training is performed using training data including:

one or more features of the first set of queries;

output of a cost function that calculates costs for executing one of more queries in the first set of queries on the first version of the data feed and execution thereof on the second version of the data feed;

after the training:

deploy the trained machine learning model for execution against a second set of queries;

receive a given query in the second set of queries from a client;

provide one or more features for the given query in the second set of queries to the machine learning model;

execute the machine learning model against the provided one or more features to produce a selection between the first and second versions of the data feed;

execute the given query in the second set of queries against either the first or second versions of the data feed, as determined by the selection, to obtain a result; and, provide the result to the client, in response to the given query in the second set of queries.

11. The system of claim 10, wherein the second version of the data feed comprises any of: a sampling of the data feed and a data sketch of the data feed.

12. The system of claim 10, wherein the cost function is dependent upon one or more of: query execution time, result accuracy relative to a reference version of the data feed, compute cost for query execution, resource consumption for query execution.

13. The system of claim 10, wherein the data feed comprises data related to network security events.

14. The system of claim 10, wherein the training data further comprise any of:

a query key;

a cardinality measure of a query key;

a number of values associated with a query key; and, a date range.

15. The system of claim 10, wherein the training data further comprise any of:

a record of user action taken after receiving results of one or more queries of the first set of queries.

16. The system of claim 10, the execution of the computer program instructions on the one or more processors further causing the system to:

apply the result to a trained second machine learning model to determine whether to rerun the given query in the second set of queries against another version of the data feed other than the selected version;

where the determination is based on a statistic of the result.

17. The system of claim 16, wherein the statistic comprises any of:

a number of records in the result, and, a distribution of the result, and a comparison of the result to past results for similar or identical queries.

18. A non-transitory computer readable medium holding computer program instructions executable on one or more processors, the computer program instructions comprising instructions to:

provide a first version and a second version of a data feed, the second version representing a reduced-size version of the first version;

train a machine learning model on a first set of queries, the training configuring the machine learning model to select between querying against (i) the first version of the data feed or (ii) the second version of the data feed;

where the training is performed using training data including:

one or more features of the first set of queries;

output of a cost function that calculates costs for executing one or more queries in the first set of queries on the first version of the data feed and execution thereof on the second version of the data feed;

after the training:

deploy the trained machine learning model for execution against a second set of queries;

receive a given query in the second set of queries from a client;

provide one or more features for the given query in the second set of queries to the machine learning model;

execute the machine learning model against the provided one or more features to produce a selection between the first and second versions of the data feed;

execute the given query in the second set of queries against either the first or second versions of the data feed, as determined by the selection, to obtain a result; and, provide the result to the client, in response to the given query in the second set of queries.

\* \* \* \* \*